March 23, 1926. 1,578,029
J. W. HEINEY
STEP FOR VEHICLE BODIES
Filed March 24, 1923 3 Sheets-Sheet 1

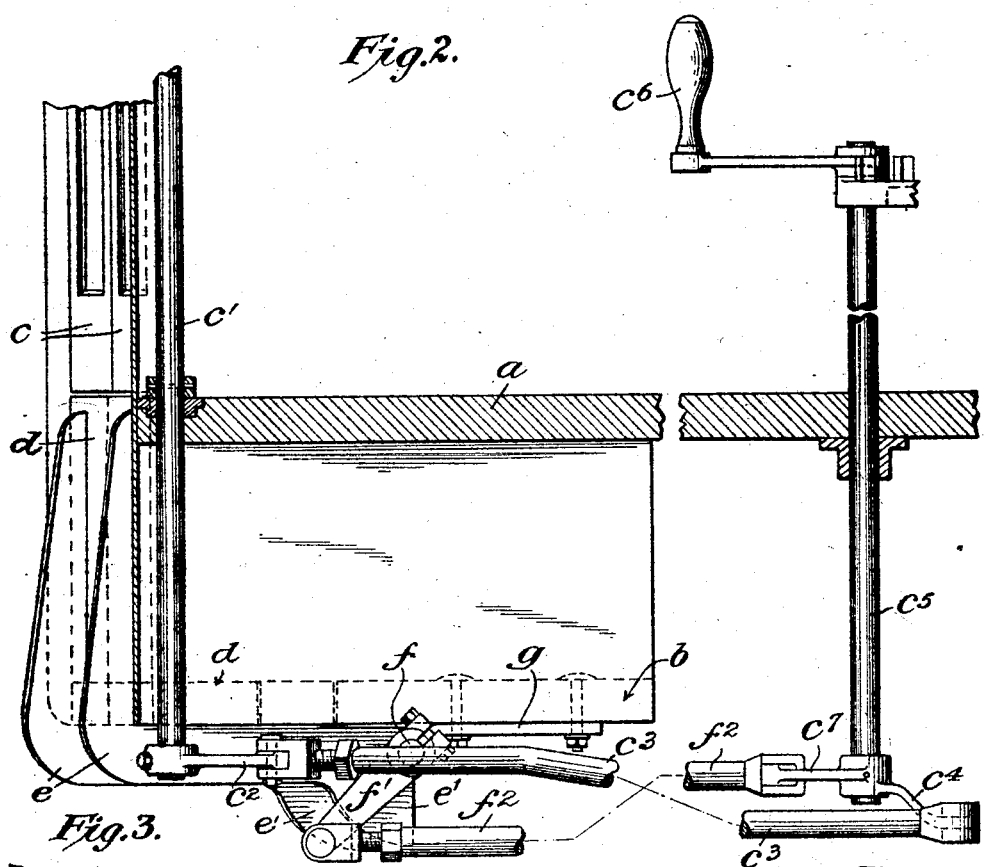
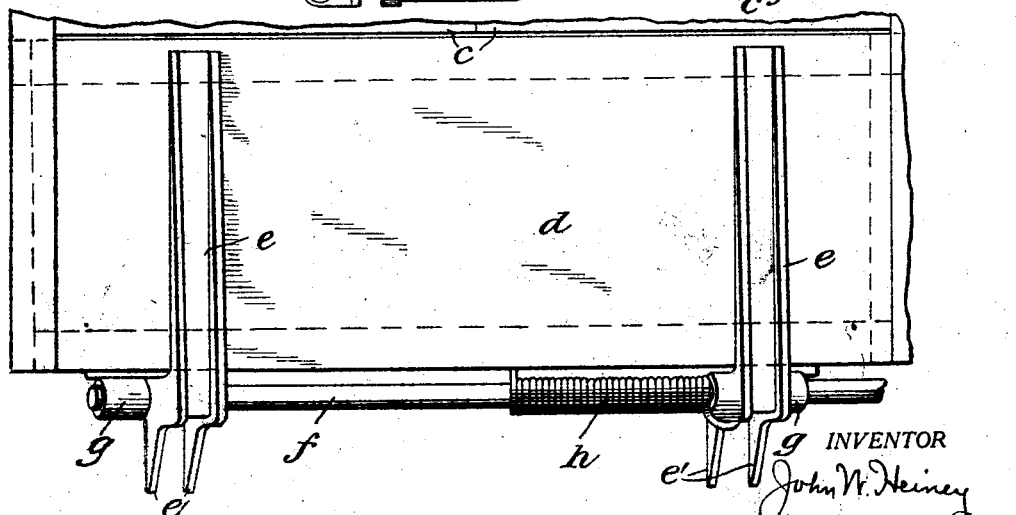

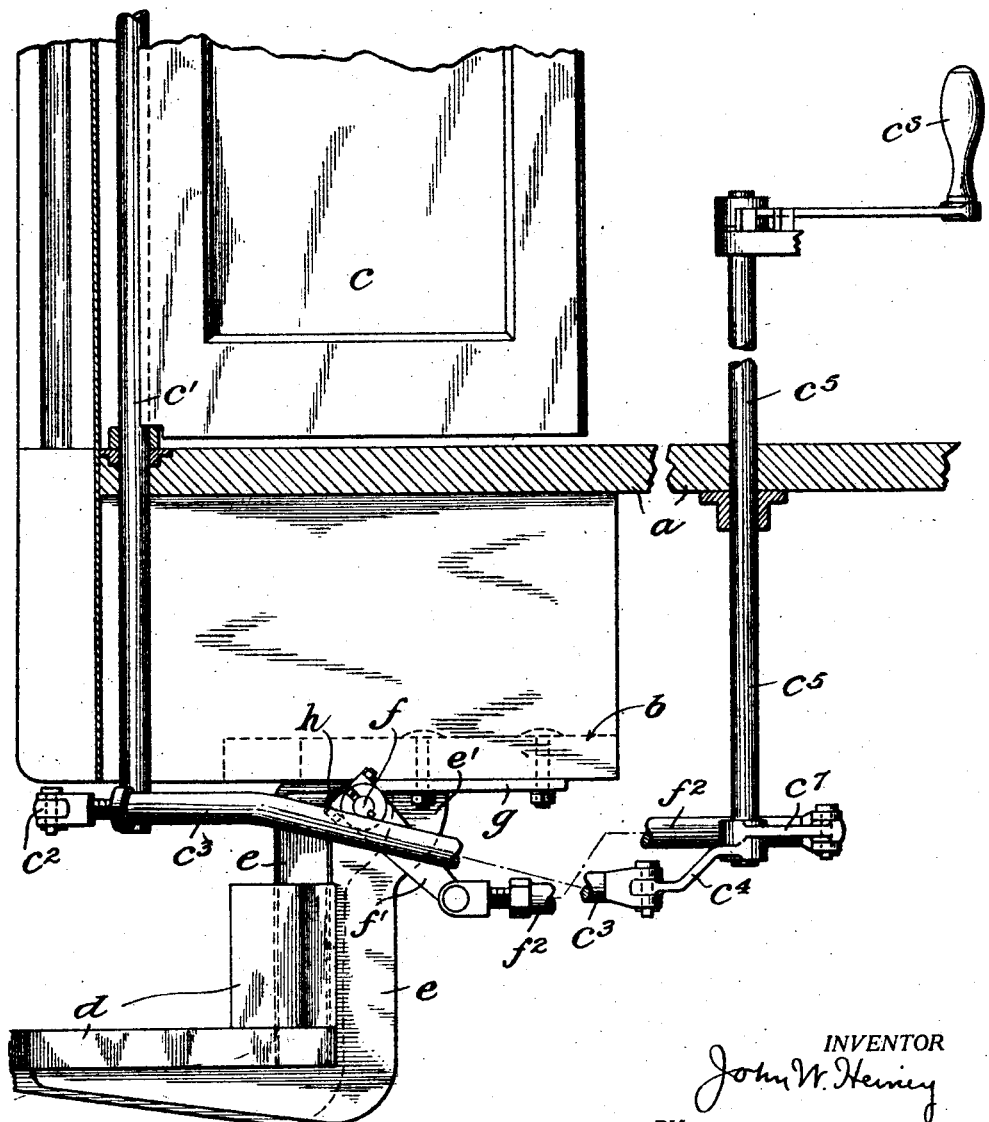

Patented Mar. 23, 1926.

1,578,029

UNITED STATES PATENT OFFICE.

JOHN W. HEINEY, OF ALLENTOWN, PENNSYLVANIA, ASSIGNOR TO INTERNATIONAL MOTOR COMPANY, OF NEW YORK, N. Y., A CORPORATION OF DELAWARE.

STEP FOR VEHICLE BODIES.

Application filed March 24, 1923. Serial No. 627,264.

*To all whom it may concern:*

Be it known that I, JOHN W. HEINEY, a citizen of the United States, residing in the city of Allentown, in the State of Pennsylvania, have invented certain new and useful Improvements in Steps for Vehicle Bodies, of which the following is a specification, reference being had to the accompanying drawings, forming a part hereof.

This invention relates to an improved step construction for vehicle bodies and is designed primarily with reference to its application to the bus bodies of motor vehicles. In such bodies ground clearance is of considerable importance and the problem arises of providing sufficient ground clearance while satisfying the convenience of the passenger. The most natural solution is to provide an additional step which will supplement the usual platform step. However, such an additional step ordinarily has the objection that it decreases the clearance and, if folded up when not in use, presents a somewhat unsightly appearance since no provision has heretofore been made for drawing it into vertical alignment with the door. The principal object of the present invention is to provide in a vehicle a folding step which, when not in use, will not decrease appreciably the ground clearance of the vehicle and will supplement therewith a substantially unbroken closure and present therewith a substantially unbroken closure of pleasing appearance.

In accordance with the invention it is proposed to hinge the improved step at the upper end of its riser so that when folded, the step takes a vertical position and the riser takes a horizontal position both being nested snugly alongside of contiguous parts. A further object of the invention is to provide in a step of the character described operating means therefor which shall be effective to swing the step up into folded position with adequate clearance and yet permit it to assume a position in vertical alignment with said door under which it rests.

A further object of the invention is to bring into combination with an improved step and its operating mechanism, door operating mechanism which shall be operable simultaneously therewith and under a single control so that upon the closing of the door the step will be pulled home finally and upon the opening of the door the step will be lowered into proper relation to the platform.

These and other advantages of the improved construction will appear in their true breadth upon consideration of the details of the embodiment illustrated in the drawings, wherein:

Figure 2 is a view in transverse section through the platform shown in Figure 1 and showing a portion of all of the parts illustrated therein, the improved step being illustrated in elevation as folded in alignment with the closed door.

Figure 3 is a view in side elevation of the improved step when folded.

Figure 4 is a view similar generally to Figure 2 but showing the step lowered.

Figure 1:
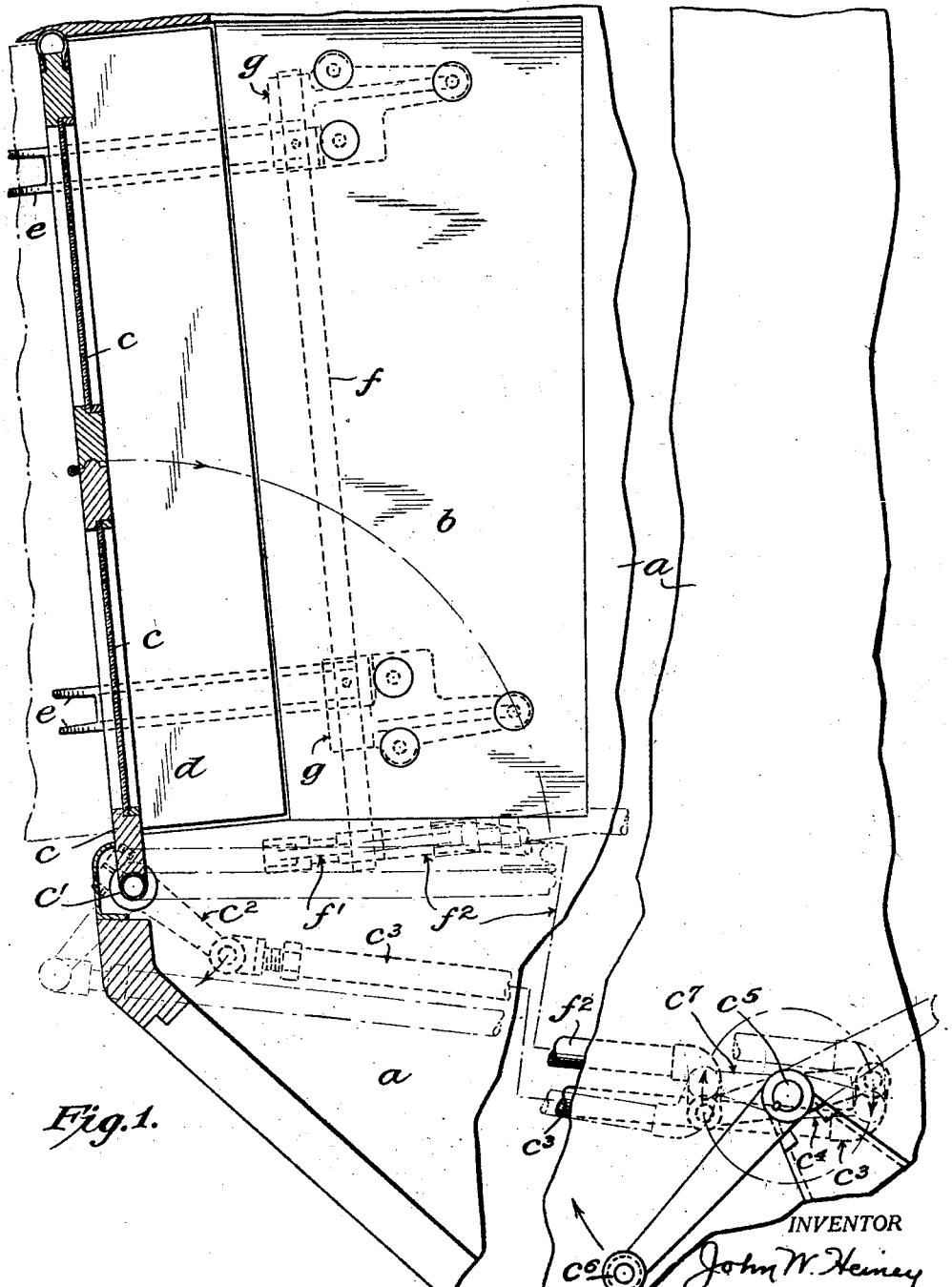
Figure 1 is a view in horizontal section showing a part of the end of a body having mounted thereon the improved step and operating mechanism therefor and indicating the relation of the door to the platform.

As the description proceeds it will be evident that the invention is not to be limited to its application to vehicle bodies for any particular purpose although it will probably find its most important application to bus bodies of motor vehicles where ground clearance is of primary importance. Many of the conventional parts of a body are indicated in the accompanying drawings but the invention is not to be limited to their form or relationship since they are shown merely for the purpose of bringing out the cooperative relation of the improved step thereto. The front platform $a$ of the body has disposed therein at one or both sides a permanent step indicated at $b$ in Figures 2 and 4. A folding door for closing the front end of the vehicle is indicated generally at $c$ and is secured on a vertically disposed tubular rock shaft $c'$ which carries at its lower end the crank arm $c^2$ connected through a link $c^3$ with a crank arm $c^4$ on the lower end of a vertically disposed rock shaft $c^5$ journaled in the platform $a$ and having at its upper end an operating handle $c^6$ of conventional form whereby the door may be swung open and closed in a manner now commonly employed. In a motor vehicle ground clearance is very important and while the permanent step $b$ may be of such elevation as to afford such clearance it will then ordinarily be a little too high for the convenience of the average passenger in boarding the vehicle or alighting therefrom. It is the principal object of the present invention to provide for the condition thus far described an additional folding step which will be of assistance to the passenger and yet will not diminish to any extent the ground clearance of the vehicle. It is provided further in accordance with the invention that the improved step may be swung into vertical position and in alignment with the door so as to complement the same in closing the body and in presenting an unbroken side wall of pleasing appearance. Still another feature is the association with such a step of operating devices therefor which shall be hooked up with the operating devices for the door. One embodiment of such an improved step is indicated by the reference character $d$ in Figure 4, this step being secured to angular risers $e$, shown as two in number. These risers are secured at their upper ends to a rock shaft $f$ which is journaled adjacent its outer ends in brackets $g$, which may be secured to the underside of the step $b$. The rock shaft $f$ has secured thereto a crank arm $f'$ which is connected through a link $f^2$ to an arm $c^7$ fixed on the operating rod $c^5$.

When the operating shaft $c^5$ is thrown to close the door $c$ the shaft $f$ is oscillated with the help of the spring $h$ thereon to throw the step $d$ upwardly into a vertical position where it is moved home into vertical alignment with the door $c$ as appears clearly in Figure 2. Movement of the step into this position is about the axis of the shaft $f$ which, as has been pointed out, is connected to the top of each riser $e$. With the parts thus folded the effective ground clearance of the vehicle is not diminished appreciably. The appearance afforded by the aligned door and step is pleasing and an unbroken opening for the platform of the body is provided. When the door is to be opened the reverse operation permits the step $d$ to swing downwardly against the action of the spring $h$, about the shaft $f$ as a center and the door simultaneously opens. Extended ends $e'$ at the upper ends of the riser $e$ and extending beyond the shaft $f$ may be provided to check the downward movement of the risers automatically and bear against the underside of the step $b$. In any event, when the step $d$ is lowered it is in proper relation to the step $b$ to afford an easy ascent and descent for the passenger.

The scope of the invention will be defined by the appended claim and it is to be understood that any equivalent forms within the claim are to be considered as a part of the invention.

What I claim is:

In a bus body for motor vehicles having a fixed step associated with the platform, an additional single step, a vertical door disposed above said additional step, L-shaped risers carrying said additional step by one of their legs respectively, means to hinge said additional step to the part of said first-named step at the upper end of the other leg of the L-shaped risers respectively vertical means to swing said additional step upwardly about the axis of the hinging means into a vertical position of alignment with the door, and to position the riser of the step so as to form a continuation of the fixed step, means to translate motion from the vertical door to the vertical operating means.

This specification signed this 21st day of March A. D. 1923.

JOHN W. HEINEY.